Feb. 7, 1933.                H. B. BYRON                1,896,836
                          MOTION PICTURE FILM
                          Filed April 23, 1931          2 Sheets-Sheet 1

INVENTOR
Hagar Bolton Byron.
BY
ATTORNEYS

Feb. 7, 1933.   H. B. BYRON   1,896,836
MOTION PICTURE FILM
Filed April 23, 1931   2 Sheets-Sheet 2
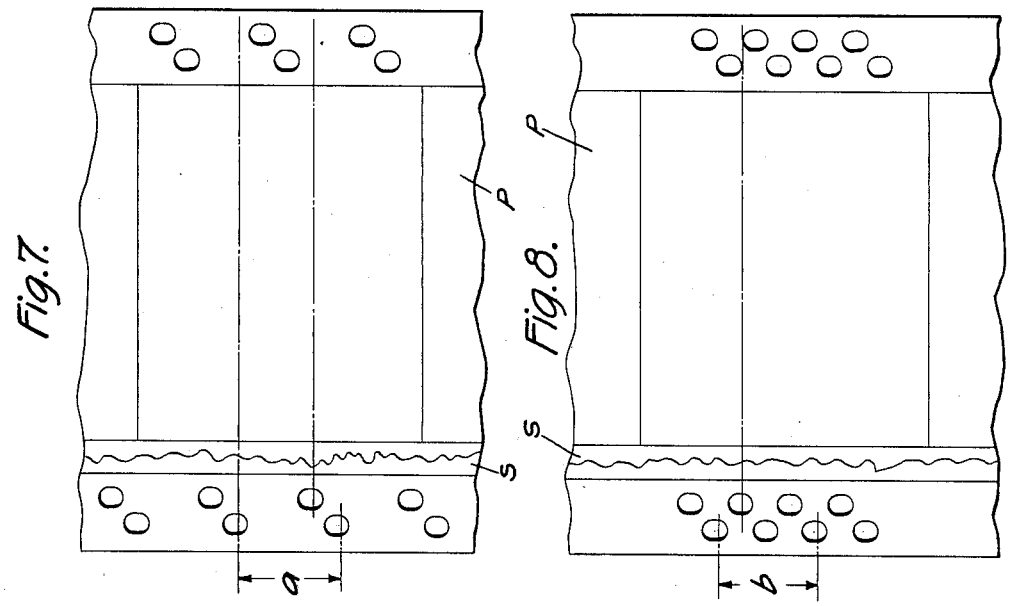
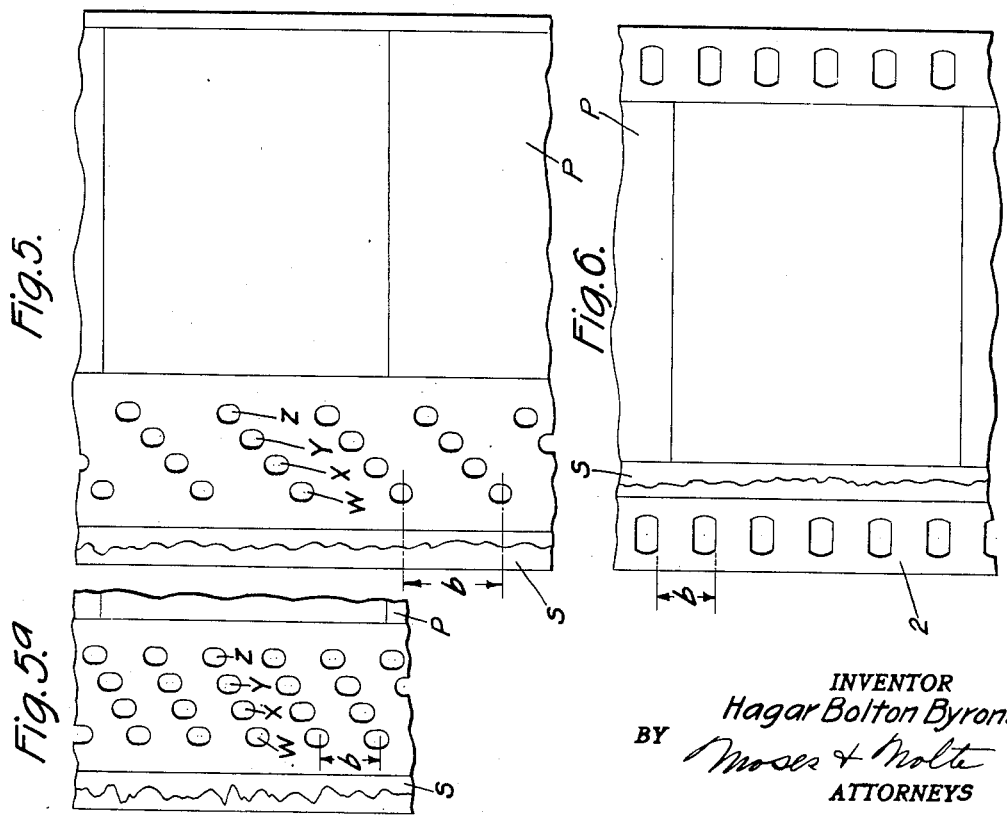
INVENTOR
Hagar Bolton Byron.
BY Moses & Nolte
ATTORNEYS Patented Feb. 7, 1933

1,896,836

UNITED STATES PATENT OFFICE

HAGAR BOLTON BYRON, OF NEW YORK, N. Y., ASSIGNOR OF ONE-HALF TO FREDERICK KALMBACH, OF NEW YORK, N. Y.

MOTION PICTURE FILM

Application filed April 23, 1931. Serial No. 532,183.

This invention relates to the feeding of motion picture film in recording, printing and projecting, and has for its primary object to overcome objectionable irregularity of feeding caused by shrinkage of the film.

Motion picture film has the property of shrinking with age, the shrinkage amounting to as much as approximately three-sixteenths of one inch per foot, or about one and one-half per cent. Film shrinks not only due to age, but also due to processing, that is, developing and fixing. The processing washes out certain salts and causes the film stock to contract.

The shrinking of the film is particularly troublesome in connection with sound motion pictures where the sound track is provided directly on the film. The reason for this will be appreciated when the fact is taken into consideration that the film is ordinarily provided with a series of equally spaced perforations adapted to be successively engaged and advanced by the teeth of a sprocket wheel. With film in which the distances between successive perforations are exactly equal to the distances between successive teeth of the driving sprocket, the feeding perforations in the film and the sprocket teeth are so related that while a first or leading tooth is still in driving engagement with the leading boundary of the leading perforation, following perforations come into cooperative relation with following teeth, so that the leading boundaries of two or more perforations are simultaneously engaged by sprocket teeth, there being no break in the continuity and evenness of the feeding.

With shrunken film, however, a different situation arises. The leading sprocket tooth engages the leading boundary of a first perforation to drive the film. Because of shrinkage the leading boundary of the following perforation is situated less than the normal distance (less than a full toothspace) behind the leading boundary of the first perforation. The following teeth, therefore, simply enter idly and loosely into the following perforations and perform no driving function until after the leading tooth has left engagement with the leading edge of the first perforation. When driving engagement between the leading tooth and the first perforation is discontinued, the positive driving relation between the sprocket and the film is temporarily interrupted until the sprocket by its continued advance has caused the next tooth to move forward into engagement with the leading edge of the perforation which it has entered. During this interval the film remains idle, with the result that the sound vibrations intended to be recorded on a uniformly fed film pile up and overlap, and thereby greatly impair the quality of the sound recordation.

The same difficulty also arises in the reproduction of the record in theaters, even though the record may have been perfectly made and adapted for perfect reproduction in the absence of film shrinkage.

For the same reason the printing of a shrunken negative onto an unshrunken positive involves irregular feeding of the negative, with the result that an imperfect or blurred print is obtained, this imperfection being present both in the sound and the picture portions of the positive.

It is the object of the present invention to reduce to the greatest extent the difficulties and defects above pointed out.

Other objects and advantages will hereinafter appear.

In the drawings forming part of this specification:

Figure 5 is a fragmentary view illustrating a novel form of film embodying features of the present invention;

Figure 5a is a fragmentary view illustrating a form of film similar to that of Figure 5 but adapted to be used with the particular sprocket illustrated in Figure 1;

Figure 6 is a view similar to Figure 5 illustrating film of the kind ordinarily employed, and which may be employed in conjunction with the mechanism of Figure 2;

Figure 7 is a fragmentary view of a further form of film embodying features of the invention; and Figure 8 is a fragmentary view of a further modified form of film embodying features of the invention.

Figure 2:
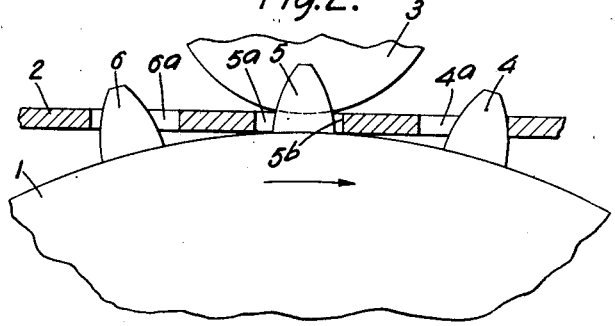
Figure 2 is a similar view illustrating the condition which arises with shrunken film employed in connection with the ordinary sprocket feeding mechanism.

The reason why shrinkage is troublesome in connection with a motion picture film may be explained by having reference to Figure 2, in which the reference character 1 designates a sprocket wheel of usual construction which drives the film in a motion picture camera, projector, printing or processing machine, and reference character 2 designates the film, 3 being a wheel for holding the film in engagement with the sprocket 1. The sprocket 1 is provided with teeth 4, 5, 6, etc., which teeth engage in corresponding perforations 4a, 5a, and 6a provided in the film. By reason of the shrinkage of film 2 the distance between the perforations 4a and 5a is slightly less than the distance between teeth 4 and 5, the maximum difference being in the neighborhood of .003 of an inch. When, therefore, the tooth 4, which at the moment illustrated is driving film 2, leaves driving engagement with the film, the film remains stationary for a moment until the tooth 5 strikes the surface 5b of its perforation and takes up the driving of the film. The result is that the film is not propelled uniformly, but is given a slightly jerky motion.

In sound recordation, the difficulty produced by the phenomenon is that during the instant that the film remains stationary before the sound opening, various sounds will be recorded one on top of the other instead of being recorded in sequence as they should be, the result being that the sound record which is formed is not clear or true to the original sound. This causes extraneous noises in reproduction.

In printing the intermittent feed of the shrunken film causes intermittent slippage of this film relative to the sprocket and to the uniformly fed, unshrunken film with the result that the definition of the picture record and the fidelity of the sound record are impaired.

The present invention has for an object to practically overcome this slippage of the films. This is effected in several cases as illustrated in Figures 5, 5a, 7 and 8, it being understood of course, that the sprocket is suitably varied in each instance to accord with the arrangement of the driving perforations of the film.

Figure 1:
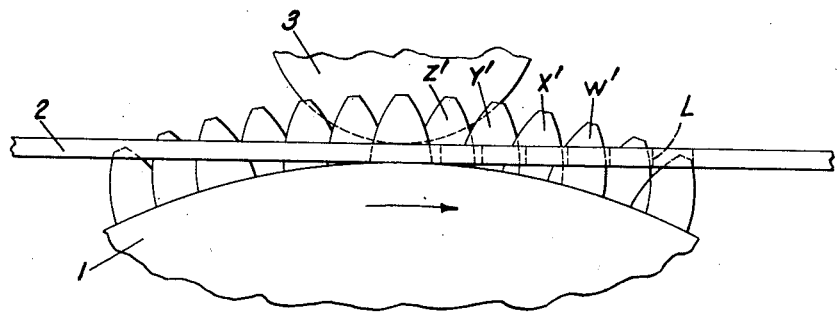
Figure 1 is a fragmentary, side elevation of a sprocket wheel and film embodying features of the invention.

In Figure 6 is illustrated a strip of motion picture film of the character now in use. The pitch between successive perforations is marked by the reference character b. Figure 5a shows a strip of the film of my invention in which the pitch b is indicated as shown. It will be observed that in the pitch distance b, I have provided a series of perforations w, x, y and z. The pitch between these perforations is one-quarter of the total pitch b. Figure 1 shows the film of Figure 5a applied to a sprocket. This sprocket is provided with teeth w', x', y' and z' for engaging in perforations w, x, y and z and the pitch between the successive teeth is equal to one-quarter of the pitch between the teeth shown in Figure 2. The sprocket teeth and the perforations of the film are arranged in echelonic formation. Assuming, therefore, that only one of these teeth is in driving engagement with the film at one time there will be a slippage between film and sprocket each time a tooth leaves driving engagement with the film, but the amount of this slippage will be only one-quarter of the slippage which existed in the arrangement shown in Figure 2. By providing any desired number of perforations and any desired number of corresponding sprocket teeth in the pitch distances b, the amount of this slippage can be reduced to any desired quantity. Figure 5 shows an arrangement similar to that of Figure 5a but one in which the apertures are not overlapped longitudinally of the film. Figures 7 and 8 show variations of the construction shown in Figures 5 and 5a.

The difference between Figure 7 and Figure 5 is that one-half of the perforations of Figure 5 have been moved from the left side of the film to the right side.

The difference between Figure 8 and Figure 5 is that in Figure 8 eight feeding perforations are provided in the pitch distance b so that the slippage per tooth is reduced to one-eighth of the amount that existed in the form of construction shown in Figures 2 and 6.

The invention as described, shows a manner in which the slippage per tooth can be reduced to any desired fraction of the now existing slippage.

The embodiment of Figure 5 is the preferred form, however, the zone of perforations being in this instance disposed between the sound track S and the picture record P, because the stronger outer zones lessen the likelihood of tearing the film.

Figure 3:
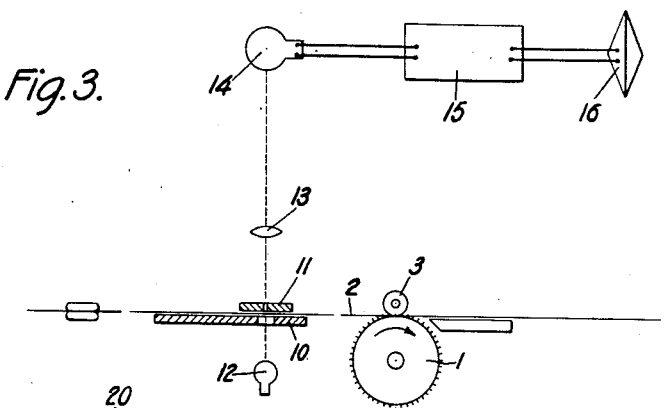
Figure 3 is a diagrammatic, sectional, side elevation of a reproducing apparatus.

The parts disclosed in Figure 3 which have not already been described are briefly as follows: The film 2 is guided to the sprocket 1 and wheel 3. In advance of the sprocket it is passed between perforated plates 10 and 11, light being projected through the sound track of the film from a constant light source 12. The light that has passed through the perforations of plates 10 and 11 and through the film is focussed by means of a lens 13 upon a photo-electric cell 14 and the audio frequency current thus generated is amplified by an amplifier 15 and converted into sound by a speaker 16.

Figure 4:
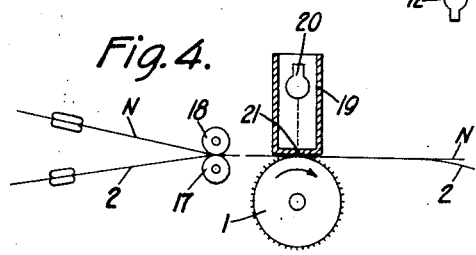
Figure 4 is a view similar to Figure 3, illustrating a printing apparatus.

In Figure 4 the positive film 2 and the negative film N are fed through separate guides into superposed relation and pass between feed rolls 17 and 18 to the sprocket wheel 1. A tube 19 having a suitable uniform light source 20 therein stands opposite the sprocket, and the light from said tube is permitted to reach the films through a narrow slot 21 in the lower end of the tube. With this arrangement the printing takes place at the sprocket wheel.

I have described what I believe to be the best embodiments of my invention. I do not wish, however, to be confined to the embodiments shown, but what I desire to cover by Letters Patent is set forth in the appended claims.

I claim:

1. A motion picture film having a picture zone, and a succession of feeding perforations arranged in echelonic formation, said perforations being spaced from one another but overlapped longitudinally of the film.

2. A motion picture film having a picture zone, a sound track, and a plurality of marginal portions, each provided with feeding perforations in echelonic formation, the perforations of the opposite marginal portions being disaligned but disposed in overlapping relation longitudinally of the film.

3. A motion picture film having a picture zone, and a succession of round feeding perforations arranged in echelonic formation, the successive perforations being overlapped longitudinally of the film, and the adjoining perforations being spaced transversely of the film.

4. A motion picture film having a picture zone and a plurality of feeding zones each provided with a plurality of laterally spaced, longitudinally extending lines of feeding perforations, the longitudinal arrangement of the perforations being such that the first perforation of the second feeding zone lies between the first and second perforations of the first feeding zone and overlaps both of them, the second perforation of the second feeding zone lies between the second and third perforations of the first feeding zone and overlaps both of them, and so on, the perforations of each zone being arranged with no substantial longitudinal spacing between successive perforations but the lines of perforations being sufficiently distinct to provide substantial webs between successive perforations.

In testimony whereof I have affixed my signature to this specification.

HAGAR BOLTON BYRON.